(12) United States Patent
Berggren et al.

(10) Patent No.: US 11,647,359 B2
(45) Date of Patent: May 9, 2023

(54) METHODS FOR UPLINK-BASED LOCALIZATION OF AN ELECTRONIC DEVICE; RELATED ELECTRONIC DEVICES AND RELATED LOCATION SERVER DEVICES

(71) Applicant: Sony Corporation, Tokyo (JP)

(72) Inventors: Anders Berggren, Lund (SE); Nafiseh Mazloum, Lund (SE); Olof Zander, Lund (SE); Rickard Ljung, Helsingborg (SE); Kåre Agardh, Lund (SE); Basuki Priyanto, Lund (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/819,058

(22) Filed: Mar. 14, 2020

(65) Prior Publication Data

US 2020/0322755 A1   Oct. 8, 2020

(30) Foreign Application Priority Data

Apr. 3, 2019 (SE) .................................... 1950411-7

(51) Int. Cl.
*H04W 4/029* (2018.01)

(52) U.S. Cl.
CPC .................. *H04W 4/029* (2018.02)

(58) Field of Classification Search
CPC ....... H04L 67/12; H04L 63/126; H04L 67/10; H04L 1/20; H04L 2209/805; H04L 41/08; H04L 41/0803; H04L 41/0813; H04L 67/18; H04L 67/42; H04L 67/04; H04W 4/029; H04W 4/38; H04W 4/80; H04W 92/18; H04W 4/02; H04W 84/18; H04W 64/00; H04W 16/28; H04W 24/10; H04W 4/021; H04W 4/027; H04W 4/50; H04W 40/20; H04W 40/22; H04W 4/025; H04W 4/026; H04W 64/006; H04W 72/0446; H04W 74/0833; H04W 12/00503; H04W 28/0226; H04W 36/32; H04W 40/18;
(Continued)

(56) References Cited

U.S. PATENT DOCUMENTS 8,660,786 B2   2/2014 Bengtson et al.
10,231,078 B1 *   3/2019 Swart ...................... H04L 67/12
(Continued)

FOREIGN PATENT DOCUMENTS

WO   2016126847 A1   8/2016

OTHER PUBLICATIONS

Extended European Search Report for corresponding European Application No. 20160096.2, dated May 28, 2020, 11 pages.
(Continued)

*Primary Examiner* — Srilakshmi K Kumar
*Assistant Examiner* — Jing Gao
(74) *Attorney, Agent, or Firm* — Tucker Ellis LLP

(57) ABSTRACT

An electronic device includes a memory circuitry, a processor circuitry, a wireless interface, and one or more sensors. The processor circuitry is configured to obtain sensor data from the one or more sensors. The processor circuitry is configured to determine mobility data based on the sensor data. The processor circuitry is configured to control, based on the sensor data, transmission of a positioning message including the mobility data, via the wireless interface, to a location server device.

20 Claims, 6 Drawing Sheets

(58) Field of Classification Search
CPC . H04W 4/33; H04W 56/0065; H04W 64/003; H04W 72/0413; H04W 72/1284; H04W 8/08; H04W 8/12; H04W 92/10; H04W 74/004; H04W 88/02; H04W 88/04
See application file for complete search history.

(56) References Cited

U.S. PATENT DOCUMENTS

| | | | | |
|---|---|---|---|---|
| 2003/0184475 | A1* | 10/2003 | Williams | G01S 5/02 |
| | | | | 342/465 |
| 2013/0046463 | A1* | 2/2013 | Bengtson | G01C 21/165 |
| | | | | 701/500 |
| 2014/0206382 | A1* | 7/2014 | Shabtay | G01S 5/0284 |
| | | | | 455/456.1 |
| 2016/0259956 | A1* | 9/2016 | Wassingbo | G06Q 10/08 |
| 2016/0277879 | A1 | 9/2016 | Daoura et al. | |
| 2017/0076619 | A1 | 3/2017 | Wallach et al. | |
| 2017/0180930 | A1 | 6/2017 | Mycek et al. | |
| 2017/0280287 | A1* | 9/2017 | Weksler | H04W 4/021 |
| 2018/0077533 | A1* | 3/2018 | Pandharipande | H04W 4/029 |

OTHER PUBLICATIONS

Swedish Search Report for corresponding Swedish Application No. 1950411-7, dated Oct. 28, 2019, 8 pages.

* cited by examiner

METHODS FOR UPLINK-BASED LOCALIZATION OF AN ELECTRONIC DEVICE; RELATED ELECTRONIC DEVICES AND RELATED LOCATION SERVER DEVICES

RELATED APPLICATION DATA

This application claims the benefit of Swedish Patent Application No. 1950411-7, filed Apr. 3, 2019, the disclosure of which is incorporated herein by reference in its entirety.

TECHNICAL FIELD

The present disclosure pertains to the field of wireless localization. The present disclosure relates to an electronic device configured to enable uplink localization, a location server device and related methods.

BACKGROUND

Tracking solutions to locate an object (such as an electronic device, an Internet-of-Things (IoT) device, an equipment, a tool, even a person) have for example been tested in hospital and office environments. The major benefit of applying tracking solutions is that the object may be located quickly.

For example, core technologies applied in tracking solutions may involve a transmitter device (for example a Bluetooth beacon transmitter) attached to an object, relay devices (for example observer devices), and a location server device (for example for cloud computing). For example, the relay devices receive a signal (for example a Bluetooth beacon signal) which is transmitted from the transmitter device and obtain the signal strength and the transmitter device identifier. For example, the relay devices further transmit this information to the location server device. There are typically many relay devices around the transmitter device. The location server device then estimates the position of the transmitter device (and of the object to which the transmitter device is attached) based on information from one or more relay devices. The location server device presumably knows the position/local coordinate of the relay devices.

The aforementioned solution can provide the position estimate of an object. However, the positioning of the object may not be accurate because the positioning estimation relies solely on the received signal strength. Another potential issue is that the aforementioned solution requires high power consumption because the transmitter device is requested to always (or continuously, or regularly) transmit Bluetooth beacon with a transmission repetition frequency according to for example a specified required update interval.

SUMMARY

Accordingly, there is a need for electronic devices and location server devices, which mitigate, alleviate or address the shortcomings existing and provide an improved battery lifetime and an improved positioning accuracy, possibly at relatively reduced cost.

An electronic device is disclosed, the electronic device comprising a memory circuitry, a processor circuitry, a wireless interface, and one or more sensors. The processor circuitry is configured to obtain sensor data from the one or more sensors. The processor circuitry is configured to determine mobility data based on the sensor data. The processor circuitry is configured to control, based on the sensor data, transmission of a positioning message including the mobility data, via the interface, to a location server device.

Further, a method performed by an electronic device for enabling uplink-based localization of the electronic device, wherein the electronic device comprises one or more sensors is provided. The method comprises obtaining sensor data from the one or more sensors. The method comprises determining mobility data based on the sensor data. The method comprises controlling, based on the sensor data, transmission of a positioning message including the mobility data to a location server.

The present disclosure provides a computer readable storage medium storing one or more programs, the one or more programs comprising instructions, which when executed by an electronic device cause the electronic device to perform any of the methods disclosed herein.

It is an advantage of the present disclosure that the battery lifetime of the electronic device is optimised when possible, while on the other hand it is beneficial to improve the accuracy of estimation of the positioning of the electronic device at relatively low cost. Uplink-based positioning is provided or enhanced by utilizing in-device sensors (for example motion sensors). Sensors (for example motion sensors) are widely available with relatively low costs. Thus, the extra costs for applying sensors can be kept relatively low.

Further, a location server device is disclosed, the location server device comprising a memory circuitry, a processor circuitry, and an interface. The interface is configured to receive, from an electronic device via one or more relay devices, a positioning message including mobility data. The processor circuitry is configured to estimate a position of the electronic device based on the mobility data.

Further, a method performed by a location server device, for enabling uplink-based localization of an electronic device is provided. The method comprises receiving from the electronic device via one or more relay devices, a positioning message including mobility data, and estimating a position of the electronic device based on the mobility data.

The present disclosure provides a computer readable storage medium storing one or more programs, the one or more programs comprising instructions, which when executed by a location server device cause the location server device to perform any of the methods disclosed herein.

It is an advantage of the present disclosure that the location server device determines or estimates the location or positioning of the electronic device with improved accuracy by exploiting the mobility data provided by the electronic device.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1:
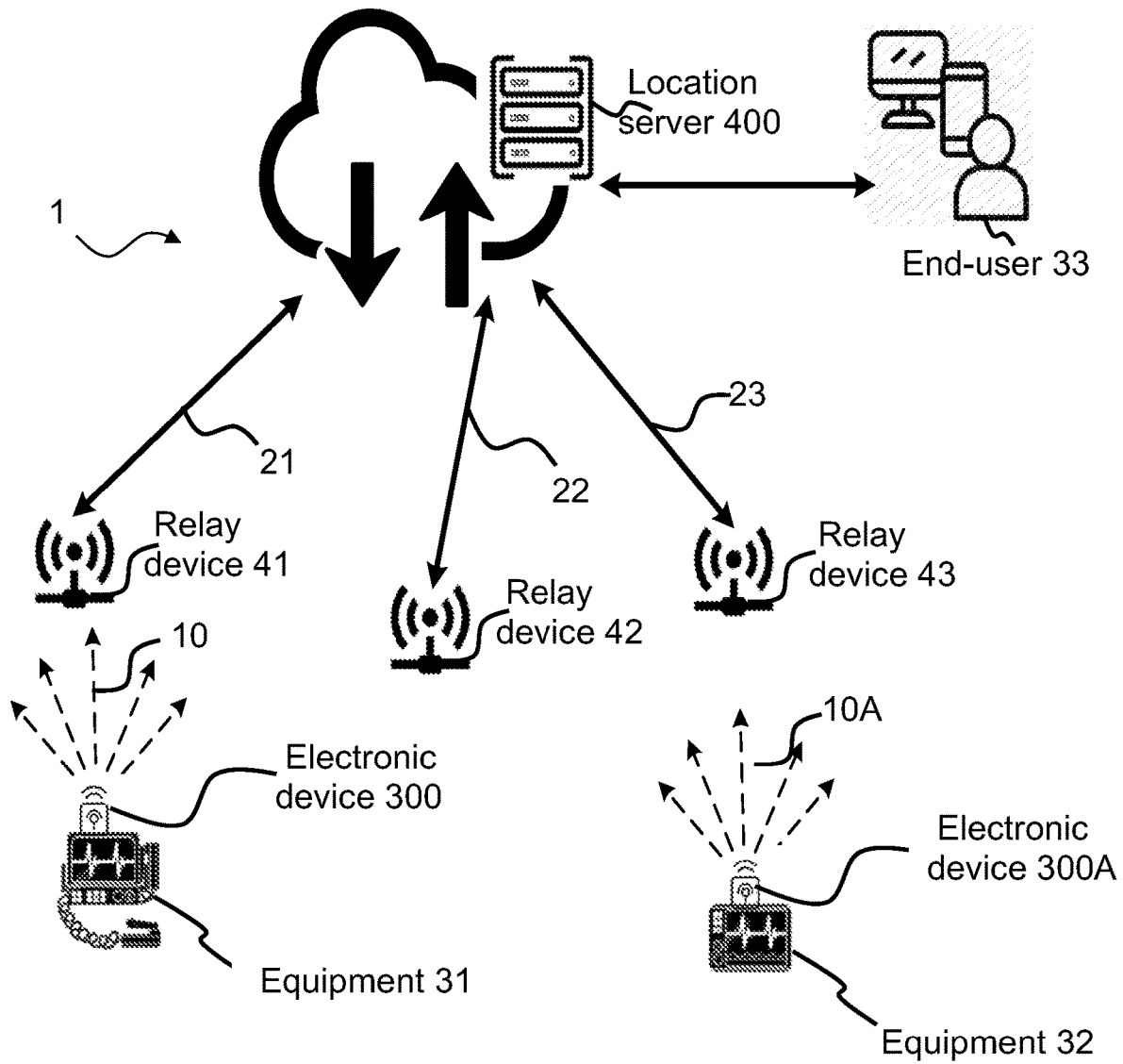
FIG. 1 is a diagram illustrating an example positioning system comprising an example location server device and example electronic device according to this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example positioning system 1 comprising an example location server device 400 and an example electronic device 300 according to this disclosure.

The positioning system 1 may comprise relay devices 41, 42, 43. A relay device may refer to a device capable of communication with the electronic device 300 to support positioning estimation. Examples of relay devices comprise observer devices, gateway devices, and/or receiver devices.

The electronic device 300, 300A may be configured to communicate with one or more relay devices 41, 42, 43 via wireless links 10, 10A (for example a radio link, Wi-Fi link and/or Bluetooth link). The one or more relay devices 41, 42, 43 may be configured to communicate with the location server device 400 via links 21, 22, 23 comprising a wireless link and/or a wired link. The electronic device 300, 300A may comprise one or more sensors (for example sensors capable of detecting and/or measuring motion). For example, the one or more sensors may be built into the same housing as the electronic device 300, 300A. For example, one or more sensors may be one or more external sensors connected to the electronic device 300, 300A. For example, the one or more external sensors separate physical units from the electronic device 300, 300A. Such connection between the electronic device 300, 300A and one or more sensors may be implemented via a wireless or wired communication link. The electronic device 300, 300A may be configured to obtain sensor data from the one or more sensors, to determine mobility data based on the sensor data, and to control, based on the sensor data, transmission of a positioning message including the mobility data to the location server device 400.

The location server device 400 may be a cloud-based location server device 400 configured to provide cloud computing. For example, the location server device may act as a positioning server. The location server device 400 may be configured to estimate the position of the electronic devices 300, 300A for example based on mobility data indicative of motion of the electronic device 300, 300A. The location server device 400 may be configured to communicate with an end-user 33 for providing an estimate of the position of the electronic device 300, 300A to the end-user 33. The location server device 400 may hold information regarding position and/or location (for example local coordinate) of the relay devices.

The electronic devices 300, 300A may refer to mobile devices and/or a user equipment, UE, and/or IoT devices and/or a beacon transmitter device. It is to be noted that most of the electronic devices in the category of smartphone devices and/or tablet devices are already equipped with motion sensors. Smartphone and/or tablet devices are equipped with a large computing capacity (for example equipped with multi-core processors, high memory capacity). Thus, estimating the position of the smartphone/tablet devices can be done internally in the device. However, the electronic devices (for example used in a warehouse, on hospitals and/or in office environments) which are meant for being positioned with use of tracking solutions are typically of low-cost with extremely low processing capacity. For example, the electronic devices may be IoT devices with an extremely low processing capacity and with limited battery capacity, but the electronic devices need to operate with a long battery lifetime (for example 2-10 years).

The electronic devices 300, 300A may be configured to attach to an object, such as equipment 31, 32 (for example a furniture, a bed, a machined (for example a medical equipment). In or more example embodiment, the electronic devices 300, 300A may be integrated with an object. For example, let us assume that equipment 31 and 32 are medical equipment having each an electronic device 300, 300A (for example transmitters, for example beacon transmitters) attached. The relay devices 41, 42, 43 may each have a receiver (for example Bluetooth receiver) to detect and read the payload of a transmitted signal (for example Bluetooth beacon) from electronic devices 300, 300A attached to the medical equipment. The relay devices 41, 42, 43 may further transmit (for example via Wi-Fi) the collected information to the location server device 400. The location server device 400 may be configured to perform network-based location/positioning estimates and report the estimated position of the equipment 31, 32 to an end-user 33.

Figure 2A:
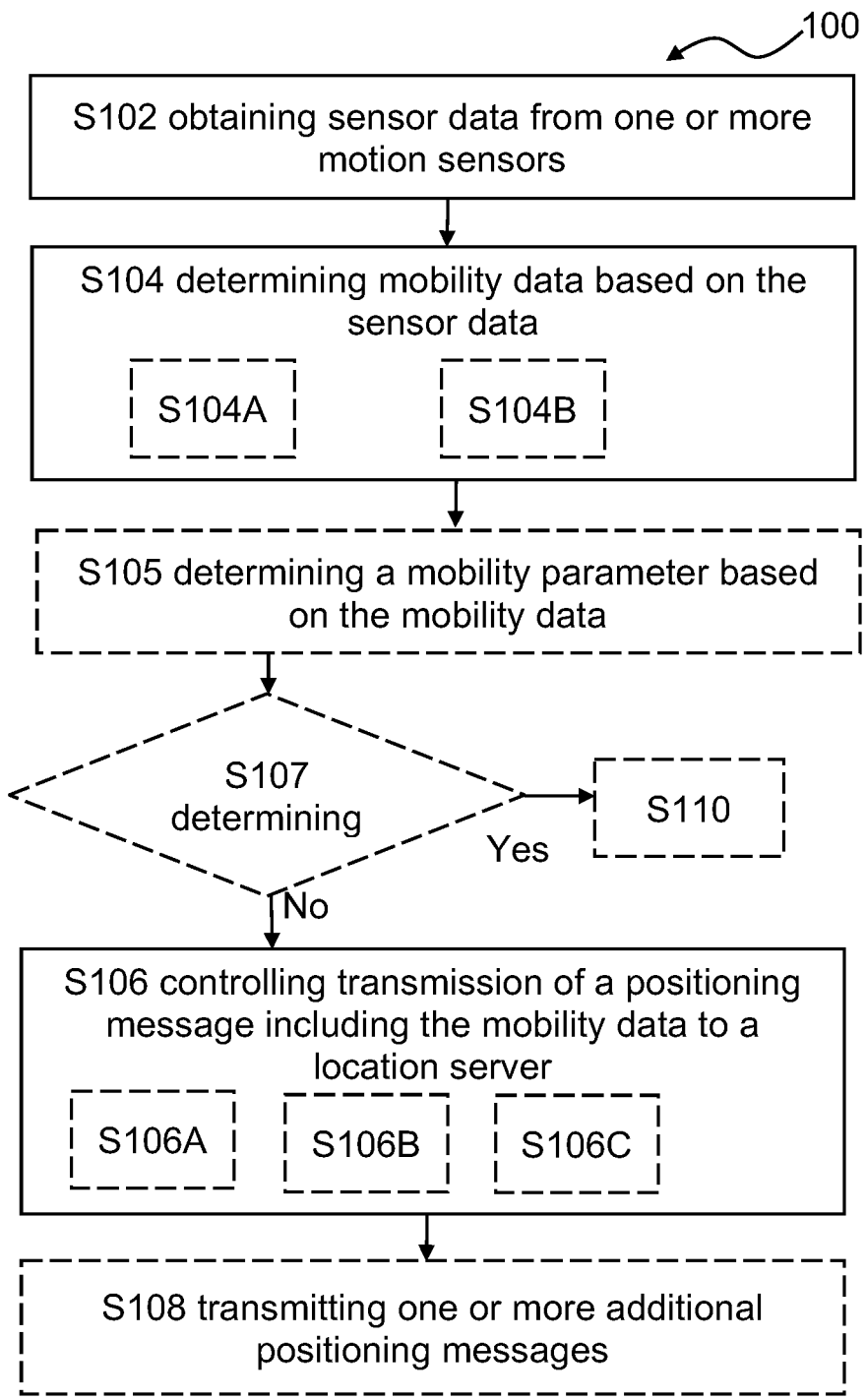
FIG. 2A is a flow-chart illustrating an example method, performed by an electronic device, for enabling uplink-based localization of the electronic device according to this disclosure.

FIG. 2A shows a flow diagram of an example method, performed by an electronic device, for enabling uplink-based localization of the electronic device according to this disclosure.

Figure 4:
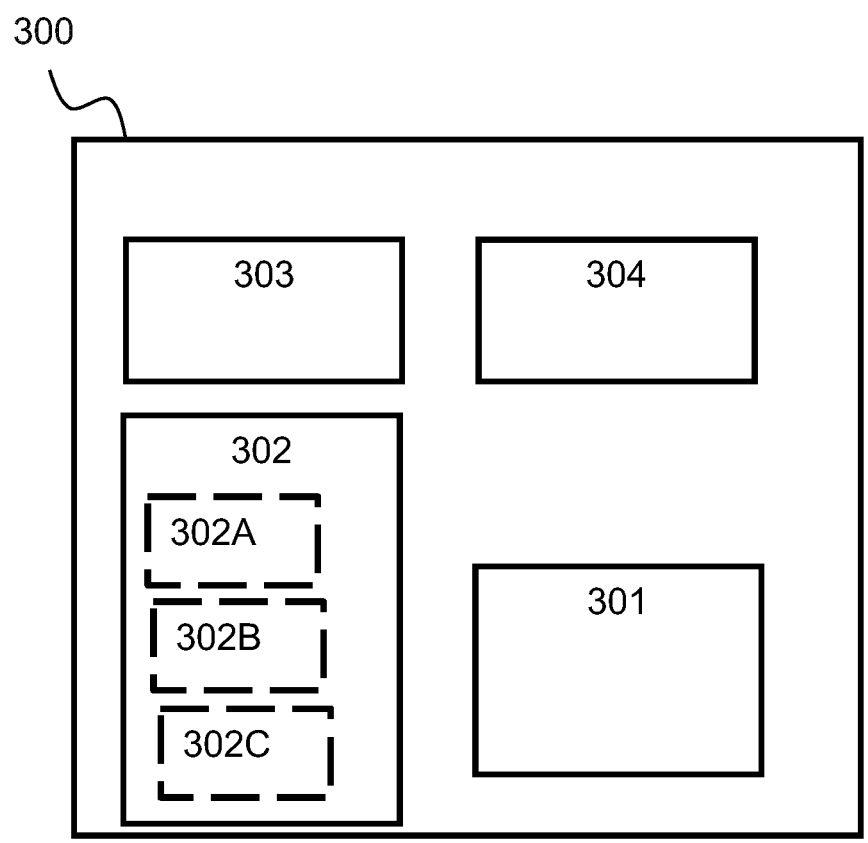
FIG. 4 is a block diagram illustrating an example electronic device according to this disclosure.

The method 100 is performed by an electronic device (for example electronic device disclosed herein, for example electronic device 300 of FIGS. 1 and 4), for enabling uplink-based localization of the electronic device (for example for supporting uplink-based localization of the electronic device for example performed at a location server device). For example, the localization of the electronic device, in other words, provides a tracking solution for localizing the electronic device in various fields (for example a warehouse, departments for positioning equipment, in hospitals and/or in office environments).

In one or more example methods, the electronic device comprises one or more sensors. In one or more example methods, the one or more sensors may comprise motion sensors. In one or more example methods, the one or more sensors may comprise light sensors and/or sound sensors. For example, motion sensors may be used for positioning/tracking an electronic device. Advantageously, motion sensors may be included in the electronic device to be positioned using uplink-based location technology. For example, a motion sensor may be included in the beacon transmitter of the electronic device.

For example, the one or more sensors may comprise an accelerometer, a gyroscope, and/or a magnetometer. An accelerometer measures the acceleration of the electronic device by measuring the forces affecting the accelerometer sensor. The results of the measurements are expressed in speed per second (in $m/s^2$). The acceleration is measured relative to three axes (x,y,z) of the electronic device coordinate system. A gyroscope measures the angular velocity around the three axes of the electronic device. The measurements returned of the gyroscope are expressed in degrees or radians per second, and indicate how the electronic device is rotating. Integrating the gyroscope output may provide the total change in angle during the integration time. A magnetometer measures the strength and direction of the magnetic field affecting the electronic device in three axes in space. The measurements of the magnetometer are expressed in micro-Tesla. The electronic device may be equipped with one or more of: an accelerometer, a gyroscope, and/or a magnetometer sensor.

The method 100 comprises obtaining S102 sensor data from the one or more sensors. Obtaining S102 the sensor data may comprise retrieving, using a processor circuitry of the electronic device, the sensor data from the one or more sensors comprised in the electronic device. For example, sensor data comprises acceleration data of the electronic device, by measuring the forces affecting the sensor. The measurements returned are expressed in speed per second (in m/s2). The acceleration data is related to the 3 axes (x,y,z) of the electronic device coordinate system. For example, sensor data comprises an angular velocity around the three axes of the electronic device. The measurements returned are expressed in degrees or radians per second and indicate how the device is rotating. For example, sensor data comprises a strength and/or direction of the magnetic field affecting the device in three axes. The measurements are expressed in micro-Tesla.

The method 100 comprises determining S104 mobility data based on the sensor data. In one or more example methods, determining S104 the mobility data based on the sensor data may comprise determining S104A a mobility status parameter based on the sensor data, wherein the mobility data comprises the mobility status parameter. For example, depending on the electronic device mobility indicated by the sensor data, the electronic device (for example the beacon transmitter) may also include its mobility status parameter (for example static, low mobility, or high mobility) in the positioning message (for example in the payload of the Bluetooth beacon transmission, in addition to the electronic device identifier). Thereby, the electronic device positioning accuracy is increased.

In one or more example methods, determining S104 the mobility data based on the sensor data may comprise determining S104B, based on the sensor data, a relative movement parameter of the electronic device with respect to a position indicated by a previously transmitted mobility data. In one or more example methods, the mobility data comprises the relative movement parameter. For example, an electronic device with one or more sensors (for example motion sensors) may be configured to measure a relative movement parameter of the electronic device and to calculate the present position for example compared to the position of the electronic device when last transmitting a positioning message (for example the position of the last beacon transmission). The last transmitted positioning message (for example the last beacon) may be enriched or not. The last transmitted positioning message may include a timestamp at the electronic device and/or at the location server device, and/or may include the timestamp of calculation (determination of the position) and/or of the received relative position.

Further, the electronic device may be configured to measure a direction indication between the present position and the position of the electronic device when last transmitting a positioning message. If the payload size of the positioning message permits, the electronic device can also piggy-back information indicative of the relative movement (for example the relative movement parameter, for example relative position) of the electronic device and optionally the sensor data, optionally via the relay devices.

The method 100 comprises controlling S106, based on the sensor data, transmission of a positioning message including the mobility data to a location server device. In other words, output of built-in sensors (for example motion sensors) may be used to control the transmission of the positioning message from the electronic device.

In one or more example methods, the transmission of a positioning message to the location server device may be performed via one or more relay devices. For example, one or more relay devices may refer to one or more observer devices, gateway devices, receiver devices, access points and/or similar.

In one or more example methods, controlling S106 the transmission of the positioning message including the mobility data may comprise controlling S106A a periodicity of the transmission of the positioning message. Alternatively, controlling S106 the transmission of the positioning message including the mobility data may comprise controlling frequency of transmission of the positioning message. For example, the electronic device may determine and control the periodicity or frequency of the transmission of the positioning message.

For example, the electronic device may be configured to determine a periodicity from a plurality of pre-configured periodicity parameters.

In one or more example embodiments, the location server device may be aware (be informed) of the periodicity of the transmission of the positioning message. Thereby, the location server device may determine when the next positioning message (for example position update) may be available. Alternatively, in one or more example embodiments, the location server device may be not-aware (not be informed) of the periodicity of the transmission of the positioning message, but may be configured to predict the periodicity based on the previous positioning messages.

In one or more example methods, the periodicity of the transmission of the positioning message from the electronic device may be determined based on for example the battery status and/or the mobility status (for example the mobility of the electronic device), and/or the type of equipment (for example the type of electronic device, for example IoT). For example, in case the battery status and/or the mobility status is low (for example below a threshold), no positioning message is transmitted, or the positioning message is transmitted with a low periodicity or frequency. In case the battery status and/or the mobility status is high (for example above a threshold), then the periodicity/frequency is high. Thereby, the power consumption is reduced, and the battery lifetime is increased or optimised.

In one or more example methods, controlling S106 the transmission of the positioning message including the mobility data may comprise forgoing S106B the transmission of the positioning message including the mobility data. For example, when the one or more sensors (for example motion sensors) indicate no movement of the electronic device (for example no movement of the equipment to which the electronic device may be attached when applicable), then it may be expected that the position of the electronic device is not changing. In such a case, the electronic device may forgo or stop the transmission of the positioning message. In other words, the beacon transmitter of the electronic device may be prevented from transmitting Bluetooth beacons, or the beacons may be transmitted with longer periodicity. Thereby, the power consumption is reduced, and the battery lifetime is increased.

In one or more example methods, the method 100 may comprise determining S105, based on the mobility data, a mobility parameter indicative of the mobility data. In one or more example methods, the mobility parameter may comprise an amount of motion, a velocity parameter, a distance traveled, and/or an acceleration parameter.

In one or more example methods, controlling S106, based on the sensor data, transmission of the positioning message including the mobility data comprises controlling S106C, based on the mobility parameter, the transmission of the positioning message. For example, the electronic device may scale (for example linearly) the periodicity of the transmission of the positioning message. For example, controlling S106 of the transmission of the positioning message including the mobility data may be performed gradually based on the amount of motion (for example on how much the electronic device is moving). In other words, if the amount of motion indicated by the one or more sensor is relatively limited (for example the electronic device is moving only slightly), the periodicity (for example the time period) of the transmission of the positioning message may be increased or set to a larger periodicity (for example semi-long) or the frequency of the transmission of the positioning message may be decreased. Alternatively, if the amount of motion indicated by the one or more sensors is larger (for example the electronic device is moving more), the periodicity of the transmission of the positioning message may be reduced or set to a shorter periodicity (for example the frequency may be larger).

In one or more example methods, the method 100 may comprise determining S107 whether the mobility parameter indicative of the mobility data satisfies a motion criterion. In one or more example methods, the motion criterion may comprise a threshold. The mobility parameter does not satisfy the motion criterion when the mobility parameter is below the threshold. In other words, when the mobility parameter is below the threshold, the electronic device may be determined to not transmit a positioning message including mobility data. In one or more example methods, the method may comprise when the mobility parameter satisfies the motion criterion, transmitting S110 the positioning message including the mobility data. In other words, when the electronic device has moved sufficiently as indicated by the mobility parameter, the electronic device simply transmits the positioning message.

In one or more example methods, the method 100 comprise, when the mobility parameter does not satisfy the motion criterion, performing the controlling S106 of the transmission of the positioning message including the mobility data. In other words, when the electronic device has not moved sufficiently as indicated by the mobility parameter, the electronic device controls the transmission of the positioning message.

In one or more example methods, the positioning message may comprise one or more of: an electronic device identifier, and a timestamp. This may help the location server device to track localization of a specific electronic device and perform the disclosed methods accordingly.

In one or more example methods, the method 100 comprises transmitting S108, to the location server device, one or more additional positioning messages including the mobility data over a plurality of consecutive payload transmissions within a pre-determined time period. In one or more example methods, the one or more additional positioning messages of one or more consecutive payload transmissions may comprise a temporary electronic device identifier. In one or more example methods, a temporary electronic device identifier may comprise a random electronic device identifier. For example, the temporary electronic device identifier may be of shorter size than the electronic device identifier.

For example, when the size of positioning message is limited, the transmission of the positioning message with mobility data (for example data of the relative position of the electronic device) can be transmitted in a separate but consecutive positioning message. For example, at the end of the first positioning message (for example Bluetooth beacon) that contains the electronic device identifier (ID), there may be a temporary electronic device identifier (for example a temporary unique ID (for example random ID)). The temporary electronic device identifier may be randomly generated. In one or more example embodiment, the size of the temporary electronic device identifier may be smaller than the electronic device identifier. The temporary electronic device identifier may be used as a header for the subsequent transmission of the one or more additional positioning message including the mobility data (for example the relative position of the electronic device). For example, the electronic device may send a positioning message including the electronic device identifier and the temporary electronic device identifier prior to sending positioning messages including mobility data and the temporary electronic device identifier.

Thereby, the relay devices and the location server device know that the particular relative positioning message belongs to a specific electronic device since the temporary electronic device identifier in both transmissions match. Further, by applying a temporary electronic device identifier the reuse of the larger electronic device identifier is avoided, as the temporary electronic device identifier may be significantly smaller than the electronic device identifier.

In one or more example methods, controlling S106A a periodicity of the transmission of the positioning message and/or a frequency of the transmission of the positioning message may be based on a battery status parameter indicative of a battery status of the electronic device.

In one or more example methods, controlling S106, based on the sensor data, transmission of a positioning message including the mobility data to a location server device comprises controlling, based on the sensor data, transmission of a positioning message including the mobility data to a location server device via one or more relay devices. For example, the relay device may be configured to receive, from the electronic device, the positioning message including the mobility data, and transmitting the positioning message to the location server device. Alternatively, or additionally, the relay device may be configured to process the received positioning message and to transmit to the location server device information based on the received positioning message. In one or more example methods, the transmission to the location server device may be performed via one or more observer devices. For example, a relay device may comprise an observer device and/or a gateway device.

Figure 2B:
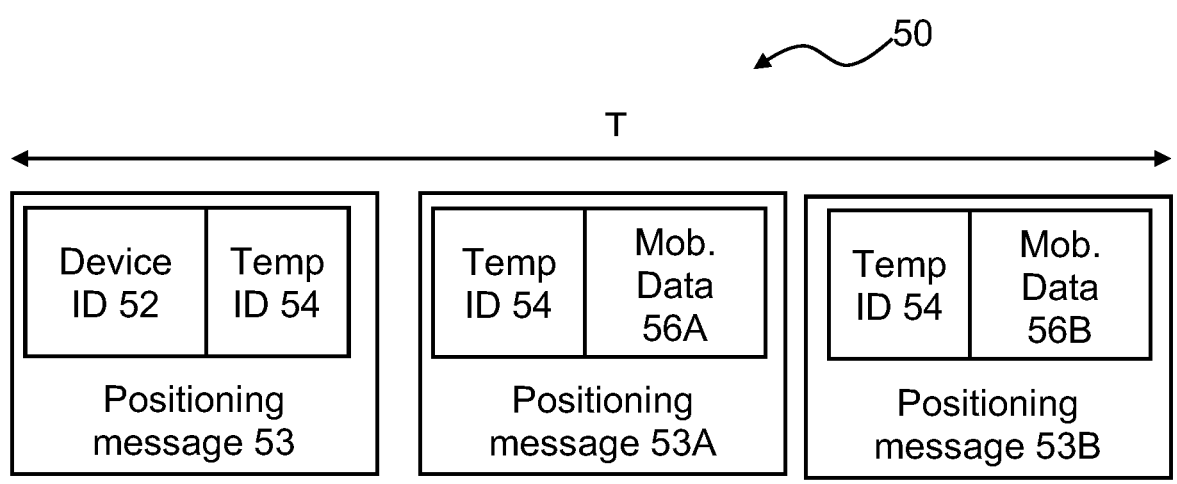
FIG. 2B is a diagram illustrating example transmission of positioning messages according to embodiments of this disclosure.

FIG. 2B is a diagram 50 illustrating example transmission of positioning messages.

The electronic device 300 is configured to control (for example based on sensor data), transmission of a positioning message including mobility data. To control the transmission of the position message may comprise transmitting a positioning message 53 comprising an electronic device identifier 52 and a temporary electronic device identifier 54 so as to further transmit the mobility data in consecutive payload transmissions.

For example, when the mobility data is of size that is above the maximum payload size of the positioning message, the electronic device 300 is configured to transmit, to the location server 400, one or more additional positioning messages 53A, 53B including the mobility data 56A, 56B over a plurality of consecutive payload transmissions within a pre-determined time period T. The one or more additional positioning messages 53A, 53B of one or more consecutive payload transmissions comprise a temporary electronic device identifier 54. Transmission of subsequent one or more additional positioning messages 53A, 53B each including mobility data 56A, 56B and the temporary electronic device identifier 54 may be carried out over a plurality of consecutive payload transmissions within a pre-determined time period, T. The positioning messages 53, 53A, 53B may be transmitted from the electronic device 300 to a location server device 400, via one or more relay devices.

The positioning message 53 and the subsequent one or more additional positioning messages 53A, 53B have the same temporary electronic device identifier 54 so that the relay devices and the location server device know that the particular positioning messages belongs to a same specific electronic device since they share the same temporary electronic device identifier 54.

Figure 3:
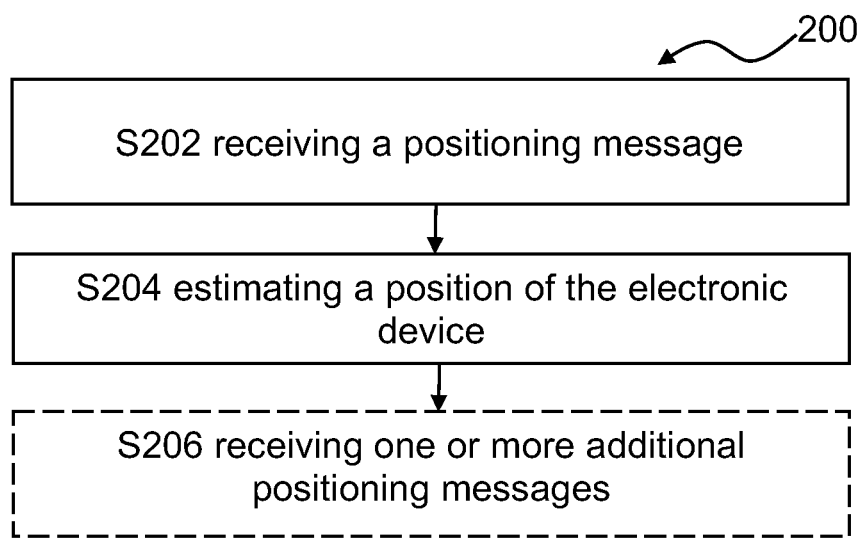
FIG. 3 is a flow-chart illustrating an example method, performed by a location server device, for enabling uplink-based localization of an electronic device according to this disclosure.

FIG. 3 shows a flow diagram of an example method 200, performed by a location server device, according to this disclosure. The method 200 is performed by a location server device, for enabling uplink-based localization of an electronic device (for example for performing uplink-based localization of an electronic device).

In one or more example methods, the method 200 comprises receiving S202, from the electronic device (for example via one or more relay devices), a positioning message including mobility data. In one or more example methods, the method 200 comprises estimating S204 a position of the electronic device based on the mobility data.

In one or more example methods, the positioning message may comprise one or more of: a mobility status parameter, a relative movement parameter, an electronic device identifier, and a timestamp (for example in addition to the mobility data).

In one or more example methods, the method 200 may comprise receiving S206 one or more additional positioning messages including the mobility data over a plurality of consecutive payload transmissions within a pre-determined time period. The one or more additional positioning messages of one or more consecutive payload transmissions may comprise a temporary electronic device identifier.

In one or more example methods, the method 200 may comprise initiating the positioning message transmission by the electronic device (for example by requesting the positioning message). For example, the location server may enable or initiate the electronic device(s) to start beacon transmission disclosed herein.

FIG. 4 is a block diagram illustrating an example electronic device 300 according to this disclosure. The electronic device 300 is configured for uplink-based localization. The electronic device 300 comprises a memory circuitry 301, a processor circuitry 302, a wireless interface 303, and one or more sensors 304.

In one or more example electronic devices, one or more sensors 304 may comprise one or more motion sensors.

The processor circuitry 302 is configured to obtain, using an obtainer circuitry 302C, sensor data from the one or more sensors 304. The obtainer circuitry 302C is configured to retrieve or obtain the sensor data from the one or more sensors 304.

The processor circuitry 302 is configured to determine, for example using a determiner module 302B (for example implemented by a determiner circuitry), mobility data 56A, 56B based on the sensor data.

The processor circuitry 302 is configured to control, for example using a controller circuitry 302A, based on the sensor data, transmission of a positioning message 53 including the mobility data 56A, 56B, via the wireless interface 303, to a location server device 400.

The wireless interface 303 may be configured for wireless communications via a wireless communication system, such as a Bluetooth, and/or Wi-Fi.

The electronic device 300 may be configured to communicate with a location server device and with relay devices using wireless communications, for example Wi-Fi or Bluetooth.

In one or more example electronic devices, the processor circuitry 302 (for example the controller circuitry or a controller module 302A) may be configured to control, based on the sensor data, the transmission of the positioning message 53 including the mobility data 56A, 56B to a location server device 400 by controlling a periodicity of the transmission of the positioning message 53.

In one or more example electronic devices, the processor circuitry 302 (for example the controller circuitry or controller module 302A) may be configured to control, based on the sensor data, the transmission of the positioning message 53 including the mobility data 56A, 56B to a location server device 400 by forgoing the transmission of the positioning message 53 including the mobility data 56A, 56B.

In one or more example electronic devices, the processor circuitry 302 (for example the determiner module 302B) may be configured to determine, based on the mobility data 56A, 56B, a mobility parameter indicative of the mobility data 56A, 56B. In one or more example electronic devices, the processor circuitry 302 (for example the controller circuitry 302A) may be configured to control, based on the sensor data, transmission of the positioning message 53 including the mobility data 56A, 56B to a location server device 400 by controlling, based on the mobility parameter, the transmission of the positioning message 53.

In one or more example electronic devices, the processor circuitry 302 may be configured to determine whether the mobility parameter indicative of the mobility data 56A, 56B satisfies a motion criterion. In one or more example electronic devices, the processor circuitry 302 (for example the controller circuitry 302A) may be configured to, when the mobility parameter does not satisfy the motion criterion, perform the control of the transmission of the positioning message 53 including the mobility data 56A, 56B.

In one or more example electronic devices, the processor circuitry 302 (for example the determiner module 302B) may be configured to determine the mobility data 56A, 56B based on the sensor data by determining a mobility status parameter based on the sensor data. In one or more example electronic devices, the mobility data 56A, 56B may comprise the mobility status parameter.

In one or more example electronic devices, the processor circuitry 302 (for example the determiner module 302A) may be configured to determine the mobility data 56A, 56B based on the sensor data by determining, based on the sensor data, a relative movement parameter of the electronic device 300 with respect to a position indicated by a previously transmitted mobility data 56A, 56B. In one or more example electronic devices, the mobility data 56A, 56B may comprise the relative movement parameter (for example a relative position).

In one or more example electronic devices, the positioning message 53 may comprise one or more of: an electronic device identifier 52, and a timestamp.

In one or more example electronic devices, the wireless interface 303 may be configured to transmit, to the location server device 400, one or more additional positioning messages 53A, 53B including the mobility data 56A, 56B over a plurality of consecutive payload transmissions within a pre-determined time period.

In one or more example electronic devices, the one or more additional positioning messages 53A, 53B of one or more consecutive payload transmissions may comprise a temporary electronic device identifier 54.

In one or more example electronic devices, the processor circuitry 302 (for example the controller circuitry 302A) may be configured to control a periodicity of the transmission of the positioning message 53 and/or a frequency of the transmission of the positioning message 53 based on a battery status parameter indicative of a battery status of the electronic device 300.

In one or more example electronic devices, the processor circuitry 302 (for example the controller circuitry 302A) may be configured to control, based on the sensor data, transmission of a positioning message 3 including the mobility data 56A, 56B to a location server device 400 by controlling, based on the sensor data, transmission of a positioning message 53 including the mobility data 56A, 56B to a location server device 400 via one or more relay devices 41, 42.

The electronic device 300 may be configured to perform any of the methods disclosed in FIG. 2A. The processor circuitry 302 is optionally configured to perform any of the operations disclosed in FIG. 2A (for example S102, S104, S105, S106, S107, S108, S110). The operations of the electronic device 300 may be embodied in the form of modules and/or the form of executable logic routines (for example, lines of code, software programs, etc.) that are stored on a non-transitory computer readable medium (for example, the memory circuitry 301) and are executed by the processor circuitry 302).

Furthermore, the operations of the electronic device 300 may be considered a method that the electronic circuitry is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 4). The memory circuitry 301 is considered a non-transitory computer readable medium. The memory circuitry 301 may be configured to store sensor data, and mobility data in a part of the memory.

Figure 5:
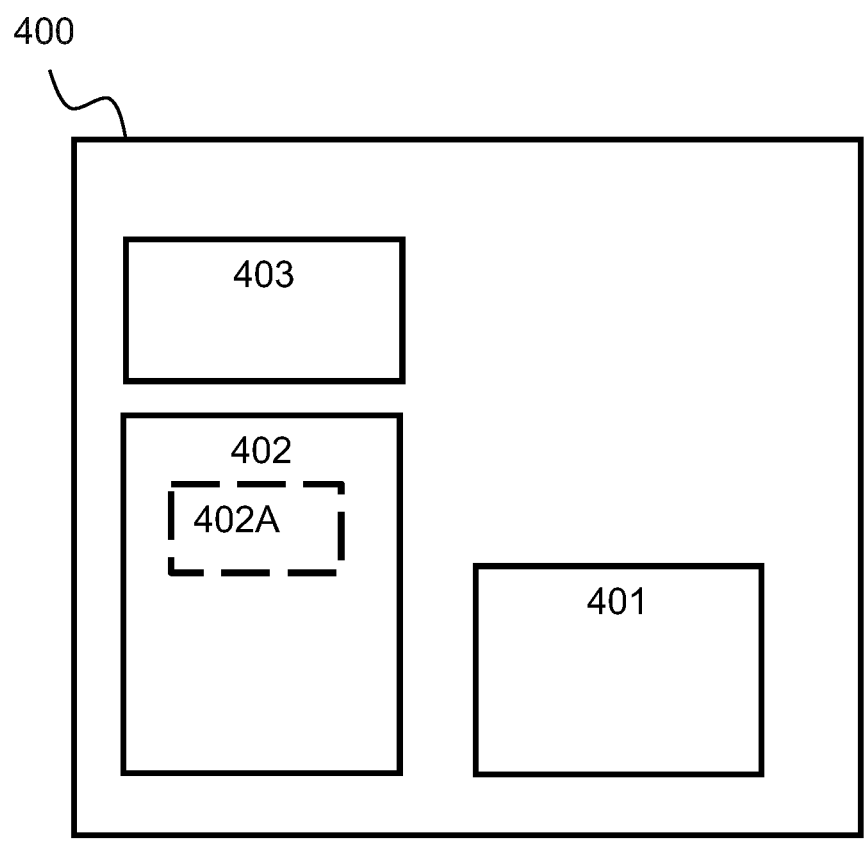
FIG. 5 is a block diagram illustrating an example location server device according to this disclosure.

FIG. 5 is a block diagram illustrating an example location server device 400 according to this disclosure. The location server device 400 comprises a memory circuitry 401, a processor circuitry 402, and an interface 403.

In one or more example location server devices, the interface 403 may comprise a wired interface and/or a wireless interface. In one or more example location server devices, the interface 403 is configured to receive, from an electronic device 300 (for example via one or more relay devices), a positioning message 53 including mobility data 56A, 56B.

In one or more example location server devices, the processor circuitry 402 is configured to estimate, using an estimator circuitry 402A (for example implementing an estimator module), a position of the electronic device 300 based on the mobility data 56A, 56B.

In one or more example location server devices, the positioning message 53 may comprise one or more of: a mobility status parameter, a relative movement parameter, an electronic device identifier 52, and a timestamp.

In one or more example location server devices, the interface 403 may be configured to receive one or more additional positioning messages 53A, 53B including the mobility data 56A, 56B over a plurality of consecutive payload transmissions within a pre-determined time period.

In one or more example location server device, the location server device may be configured to operate using a timing window parameter (for example upon which expiry, a position message is to be received).

In one or more example location server device, the location server device may be configured to send feedback to the electronic device to configure the electronic device to operate according to the disclosed methods.

The processor circuitry 402 is optionally configured to perform any of the operations disclosed in FIG. 3 (for example S202, S204, S206). The operations of the location server device 400 may be embodied in the form of modules and/or of executable logic routines (for example, lines of code, software programs, etc.) that are stored on a non-transitory computer readable medium (for example, the memory circuitry 401) and are executed by the processor circuitry 402).

Furthermore, the operations of the location server device 400 may be considered a method that the location server device is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or other suitable device. In a typical arrangement, the memory circuitry 401 may include a non-volatile memory for long term data storage and a volatile memory that functions as system memory for the processor circuitry 402. The memory circuitry 401 may exchange data with the processor circuitry 402 over a data bus. Control lines and an address bus between the memory circuitry 401 and the processor circuitry 402 also may be present (not shown in FIG. 5). The memory circuitry 401 is considered a non-transitory computer readable medium.

Embodiments of methods and products (location server device and electronic device) according to the disclosure are set out in the following items:

Item 1. An electronic device comprising a memory circuitry, a processor circuitry, a wireless interface, and one or more sensors,
 wherein the processor circuitry is configured to obtain sensor data from the one or more sensors,
 wherein the processor circuitry is configured to determine mobility data based on the sensor data, and
 wherein the processor circuitry is configured to control, based on the sensor data, transmission of a positioning message including the mobility data, via the wireless interface, to a location server device.

Item 2. The electronic device according to item 1, wherein the processor circuitry is configured to control, based on the sensor data, the transmission of the positioning message including the mobility data to a location server device by controlling a periodicity of the transmission of the positioning message.

Item 3. The electronic device according to any of the previous items, wherein the processor circuitry is configured to control, based on the sensor data, the transmission of the positioning message including the mobility data to a location server device by forgoing the transmission of the positioning message including the mobility data.

Item 4. The electronic device according to any of the previous items, wherein the processor circuitry is configured to:
 determine, based on the mobility data, a mobility parameter indicative of the mobility data; and
 control, based on the sensor data, transmission of the positioning message including the mobility data to a location server device by controlling, based on the mobility parameter, the transmission of the positioning message.

Item 5. The electronic device according to any of the previous items, wherein the processor circuitry is configured to:
 determine whether the mobility parameter indicative of the mobility data satisfies a motion criterion,
 when the mobility parameter does not satisfy the motion criterion, perform the control of the transmission of the positioning message including the mobility data.

Item 6. The electronic device according to any of the previous items, wherein the processor circuitry is configured to determine the mobility data based on the sensor data by determining a mobility status parameter based on the sensor data, wherein the mobility data comprises the mobility status parameter.

Item 7. The electronic device according to any of the previous items, wherein the processor circuitry is configured to determine the mobility data based on the sensor data by determining, based on the sensor data, a relative movement parameter of the electronic device with respect to a position indicated by a previously transmitted mobility data, wherein the mobility data comprises the relative movement parameter.

Item 8. The electronic device according to any of the previous items, wherein the positioning message comprises one or more of: an electronic device identifier, and a timestamp.

Item 9. The electronic device according to any of the previous items, wherein the wireless interface is configured to transmit, to the location server device, one or more additional positioning messages including the mobility data over a plurality of consecutive payload transmissions within a pre-determined time period.

Item 10. The electronic device according to item 9, wherein the one or more additional positioning messages of one or more consecutive payload transmissions comprise a temporary electronic device identifier.

Item 11. The electronic device according to any of items 2-10, wherein the processor circuitry is configured to control a periodicity of the transmission of the positioning message and/or a frequency of the transmission of the positioning message based on a battery status parameter indicative of a battery status of the electronic device.

Item 12. The electronic device according to any of the previous items, wherein the processor circuitry is configured to control, based on the sensor data, transmission of a positioning message including the mobility data to a location server device by controlling, based on the sensor data, transmission of a positioning message including the mobility data to a location server device via one or more relay devices.

Item 13. A location server device comprising a memory circuitry, a processor circuitry, and an interface,
 wherein the interface is configured to receive, from an electronic device via one or more relay devices, a positioning message including mobility data, and
 wherein the processor circuitry is configured to estimate a position of the electronic device based on the mobility data.

Item 14. The location server device according to item 13, wherein the positioning message comprises one or more of: a mobility status parameter, a relative movement parameter, an electronic device identifier, and a timestamp.

Item 15. The location server device according to any of items 13-14, wherein the interface is configured to receive one or more additional positioning messages including the mobility data over a plurality of consecutive payload transmissions within a pre-determined time period.

Item 16. A method, performed by an electronic device, for enabling uplink-based localization of the electronic device, wherein the electronic device comprises one or more sensors, the method comprising
 obtaining sensor data from the one or more sensors,
 determining mobility data based on the sensor data,
 controlling, based on the sensor data, transmission of a positioning message including the mobility data to a location server device.

Item 17. The method according to item 16, wherein controlling the transmission of the positioning message including the mobility data comprises controlling (S106A) a periodicity of the transmission of the positioning message.

Item 18. The method according to any of items 16-17, wherein controlling the transmission of the positioning message including the mobility data comprises forgoing (S106B) the transmission of the positioning message including the mobility data.

Item 19. The method according to any of items 16-18, the method comprising:
  determining, based on the mobility data, a mobility parameter indicative of the mobility data; and
  wherein controlling, based on the sensor data, transmission of the positioning message including the mobility data comprises controlling (S106C), based on the mobility parameter, the transmission of the positioning message.

Item 20. The method according to any of items 16-19, the method comprising:
  determining whether the mobility parameter indicative of the mobility data satisfies a motion criterion,
  when the mobility parameter does not satisfy the motion criterion, performing the controlling of the transmission of the positioning message including the mobility data.

Item 21. The method according to any of items 16-20, wherein determining the mobility data based on the sensor data comprises determining (S104A) a mobility status parameter based on the sensor data, wherein the mobility data comprises the mobility status parameter.

Item 22. The method according to any of items 16-21, wherein determining the mobility data based on the sensor data comprises determining (S104B), based on the sensor data, a relative movement parameter of the electronic device with respect to a position indicated by a previously transmitted mobility data, wherein the mobility data comprises the relative movement parameter.

Item 23. The method according to any of items 16-22, wherein the positioning message comprises one or more of: an electronic device identifier, and a timestamp.

Item 24. The method according to any of items 16-23, the method comprises transmitting, to the location server device, one or more additional positioning messages including the mobility data over a plurality of consecutive payload transmissions within a pre-determined time period.

Item 25. The method according to item 24, wherein the one or more additional positioning messages of one or more consecutive payload transmissions comprise a temporary electronic device identifier.

Item 26. The method according to items 17-25, wherein controlling (S106A) a periodicity of the transmission of the positioning message and/or a frequency of the transmission of the positioning message is based on a battery status parameter indicative of a battery status of the electronic device.

Item 27. The method according to any of items 16-26, wherein controlling, based on the sensor data, transmission of a positioning message including the mobility data to a location server device comprises controlling, based on the sensor data, transmission of a positioning message including the mobility data to a location server device via one or more relay devices.

Item 28. A method, performed by a location server device, for enabling uplink-based localization of an electronic device, the method comprising:
  receiving, from the electronic device via one or more relay devices, a positioning message including mobility data, and
  estimating a position of the electronic device based on the mobility data.

Item 29. The method according to item 28, wherein the positioning message comprises one or more of: a mobility status parameter, a relative movement parameter, an electronic device identifier, and a timestamp.

Item 30. The method according to any of items 28-29, the method comprising receiving one or more additional positioning messages including the mobility data over a plurality of consecutive payload transmissions within a pre-determined time period.

Item 31. A computer readable storage medium storing one or more programs, the one or more programs comprising instructions, which when executed by an electronic device cause the electronic device to perform the method of any of items 16-27.

Item 32. A computer readable storage medium storing one or more programs, the one or more programs comprising instructions, which when executed by a location server device cause the location server device to perform the method of any of items 28-30.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-5 comprises some modules or circuitries or operations which are illustrated with a solid line and some modules or circuitries or operations which are illustrated with a dashed line. The modules or circuitries or operations which are comprised in a solid line are modules or circuitries or operations which are comprised in the broadest example embodiment. The modules or circuitries or operations which are comprised in a dashed line are example embodiments which may be comprised in, or a part of, or are further modules or circuitries or operations which may be taken in addition to the modules or circuitries or operations of the solid line example embodiments. It should be appreciated that these operations need not be performed by order presented. Furthermore, it should be appreciated that not all of the operations need to be performed. The example operations may be performed by any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "modules", "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules or circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the spirit and scope of the claimed disclosure. The specification and drawings are, accordingly to be regarded in an illustrative rather than restrictive sense. The claimed disclosure is intended to cover all alternatives, modifications, and equivalents.

The invention claimed is:

1. An electronic device comprising:
a memory circuitry;
a processor circuitry;
a wireless interface; and
one or more sensors,
wherein the processor circuitry is configured to obtain sensor data from the one or more sensors,
wherein the processor circuitry is configured to determine mobility data based on the sensor data,
wherein the processor circuitry is configured to determine based on the mobility data a mobility parameter indicative of the mobility data, the mobility parameter comprising one or more of:
an amount of motion of the electronic device;
a velocity parameter representative of a velocity of the electronic device; and/or
a distance traveled by the electronic device,
wherein the processor circuitry is configured to control, based on the sensor data and the mobility parameter, transmission of a positioning message comprising the mobility data, via the wireless interface, to an associated location server device, by foregoing the transmission of the positioning message until the electronic device has moved, as indicated by the mobility parameter, more than a threshold distance and, thereafter, transmitting the mobility data to the associated location server device in a plurality of positioning message transmissions, wherein each of the plurality of positioning message transmissions comprises:
information related to an identity of the electronic device; and
a payload comprising different portions of the mobility data.

2. The electronic device according to claim 1, wherein the processor circuitry is configured to control, based on the sensor data, the transmission of the positioning message comprising the mobility data to the associated location server device by controlling a periodicity of the transmission of the positioning message.

3. The electronic device according to claim 2, wherein the processor circuitry is configured to control a periodicity of the transmission of the positioning message and/or a frequency of the transmission of the positioning message based on a battery status parameter indicative of a battery status of the electronic device.

4. The electronic device according to claim 1, wherein the processor circuitry is configured to:
determine whether the mobility parameter indicative of the mobility data satisfies the motion criterion.

5. The electronic device according to claim 1, wherein the processor circuitry is configured to determine the mobility data based on the sensor data by determining a mobility status parameter based on the sensor data, wherein the mobility data comprises the mobility status parameter.

6. The electronic device according to claim 1, wherein the processor circuitry is configured to determine the mobility data based on the sensor data by determining, based on the sensor data, a relative movement parameter of the electronic device with respect to a position indicated by a previously transmitted mobility data, wherein the mobility data comprises the relative movement parameter.

7. The electronic device according to claim 1, wherein the wireless interface is configured to transmit the mobility data to the associated location server device in the plurality of positioning message transmissions over a plurality of consecutive payload transmissions within a pre-determined time period.

8. The electronic device according to claim 7, wherein the wireless interface is configured to transmit a first positioning message prior to the plurality of positioning message transmissions, the first positioning message comprising:
the identity of the electronic device; and
the information related to the identity of the electronic device comprising a temporary electronic device identifier.

9. The electronic device according to claim 1, wherein the processor circuitry is configured to control, based on the sensor data, transmission of the positioning message comprising the mobility data to the associated location server device by controlling, based on the sensor data, transmission of the positioning message comprising the mobility data to the associated location server device via one or more associated relay devices.

10. A positioning system comprising:
electronic device comprising:
a first memory circuitry;
a first processor circuitry;
a wireless interface; and
one or more sensors,
wherein the first processor circuitry is configured to obtain sensor data from the one or more sensors,
wherein the first processor circuitry is configured to determine mobility data based on the sensor data,
wherein the first processor circuitry is configured to determine based on the mobility data a mobility parameter indicative of the mobility data, the mobility parameter comprising one or more of:
an amount of motion of the electronic device;
a velocity parameter representative of a velocity of the electronic device; and/or
a distance traveled by the electronic device,
wherein the first processor circuitry is configured to control, based on the sensor data and the mobility parameter, transmission of a positioning message comprising the mobility data, via the wireless interface, to an associated location server device, by foregoing the transmission of the positioning message until the electronic device has moved, as indicated by the mobility parameter, more than a threshold distance and thereafter, transmitting the mobility data to the associated location server device in a plurality of positioning message transmissions, wherein each of the plurality of positioning message transmissions comprises: information related to an identity of the electronic device; and a payload comprising different portions of the mobility data; and a location server device comprising:
a second memory circuitry;
a second processor circuitry; and
an interface,
wherein the interface is configured to receive, from the electronic device via one or more relay devices, the plurality of positioning message transmissions comprising the mobility data, and
wherein the second processor circuitry is configured to estimate a position of the electronic device based on the mobility data.

11. The positioning system according to claim 10, wherein the positioning message comprises one or more of:
a mobility status parameter;
a relative movement parameter;
an electronic device identifier; and
a timestamp.

12. The positioning system according to claim 10, wherein the interface is configured to receive the mobility data in the plurality of positioning message transmissions over a plurality of consecutive payload transmissions within a pre-determined time period.

13. The positioning system according to claim 10, wherein the interface is configured to receive a first positioning message prior to receiving the plurality of positioning message transmissions, the first positioning message comprising:
the identity of the electronic device; and
the information related to the identity of the electronic device comprising a temporary electronic device identifier.

14. A method, performed by an electronic device, for enabling uplink-based localization of the electronic device, wherein the electronic device comprises one or more sensors, the method comprising
obtaining sensor data from the one or more sensors;
determining mobility data based on the sensor data;
determining a mobility parameter indicative of the mobility data, the mobility parameter comprising one or more of:
an amount of motion of the electronic device;
a velocity parameter representative of a velocity of the electronic device; and/or
a distance traveled by the electronic device;
controlling, based on the sensor data and the mobility data, transmission of a positioning message comprising the mobility data to a location server device; and
foregoing the transmission of the positioning message until the electronic device has moved, as indicated by the mobility parameter, more than a threshold distance and, thereafter, transmitting the mobility data to the associated location server device in a plurality of positioning message transmissions, wherein each of the plurality of positioning message transmissions comprises: information related to an identity of the electronic device; and a payload comprising different portions of the mobility data.

15. The method according to claim 14, wherein controlling the transmission of the positioning message comprising the mobility data comprises controlling a periodicity of the transmission of the positioning message.

16. The method according to claim 14, further comprising:
determining whether the mobility parameter indicative of the mobility data satisfies a motion criterion; and
performing the controlling of the transmission of the positioning message comprising the mobility data based on the sensor data and on the mobility parameter indicative of the mobility data failing to satisfy the motion criterion.

17. The method according to claim 14, further comprising:
transmitting the mobility data to the associated location server device in the plurality of positioning message transmissions over a plurality of consecutive payload transmissions within a pre-determined time period.

18. A method for enabling uplink-based localization of an electronic device, the method comprising:
obtaining, by the electronic device, sensor data from the one or more sensors;
determining, by the electronic device, mobility data based on the sensor data;
determining, by the electronic device, a mobility parameter indicative of the mobility data, the mobility parameter comprising one or more of:
an amount of motion of the electronic device;
a velocity parameter representative of a velocity of the electronic device; and/or
a distance traveled by the electronic device,
controlling, by the electronic device based on the sensor data and the mobility data, transmission of a positioning message comprising the mobility data to a location server device by foregoing, by the electronic device, the transmission of the positioning message until the electronic device has moved, as indicated by the mobility parameter, more than a threshold distance and, thereafter, transmitting the mobility data to the associated location server device in a plurality of positioning message transmissions, wherein each of the plurality of positioning message transmissions comprises: information related to an identity of the electronic device; and a payload comprising different portions of the mobility data;
receiving, by a location server from the electronic device via one or more relay devices, the plurality of positioning message transmissions comprising the mobility data; and
estimating a position of the electronic device based on the mobility data.

19. The method according to claim 17, further comprising:
transmitting a first positioning message prior to transmitting the plurality of positioning message transmissions, the first positioning message comprising:
the identity of the electronic device; and
the information related to the identity of the electronic device comprising a temporary electronic device identifier.

20. The method according to claim 18, further comprising:
transmitting the mobility data to the associated location server device in the plurality of positioning message transmissions over a plurality of consecutive payload transmissions within a pre-determined time period; and transmitting a first positioning message prior to transmitting the plurality of positioning message transmissions, the first positioning message comprising:
  the identity of the electronic device; and
  the information related to the identity of the electronic device comprising a temporary electronic device identifier.

* * * * *